United States Patent Office 3,489,740
Patented Jan. 13, 1970

3,489,740
REMOVING SULFUR CONTAINING OR BEARING COMPOUNDS FROM ORGANIC COMPOUNDS AND RESULTING PRODUCTS
Prosper E. Cholet, New Brunswick, N.J., and Jean R. Martin, New York, N.Y., assignors to Robinette Research Laboratories, Inc., Berwyn, Pa., a corporation of Pennsylvania
No Drawing. Filed Feb. 21, 1966, Ser. No. 528,805
Int. Cl. C09f 1/02, 3/02, 1/00
U.S. Cl. 260—97.7                    2 Claims

ABSTRACT OF THE DISCLOSURE

Methods for the purification and recovery of waste products of the kraft paper industry, are carried out from chemicals contaminated principally by substantial amounts of sulfur bearing impurities of organic compounds as well as other contaminants. The final products are primarily purified sulphate turpentine, tall oils, and rosins resulting from treatment with a covalent complex of a boron halide, preferably boron trifluoride with a nitrogen containing compound as complexing agent although non-nitrogen compounds may also be employed. Generally only a short agitation treatment without air absorption is necessary.

---

During the transformation of the wood of several varieties of pine into kraft paper, some non-fibrous products are obtained such as crude sulfate turpentine, tall oil, rosin, and others. These crude products are separated and collected after further use later.

Depending upon such factors as plant size, origin and composition of the available logs and/or stumps, and the available facilities at the site of the kraft paper plant, these crude waste products may have different characteristics. Some of these products may be treated at the site of the kraft paper plant; others may be shipped to other plants for treatment, equipped to purify them to variable degrees depending upon the use which is to be made of the end product.

Several methods of refining such crude products have been used, such as washing with water containing special chemicals or solvents and/or distillation, are employed. However, at practically any stage of treatment, these by-product derivatives contain sulfur compounds of various types and at concentrations which do not permit the products to be used but in a very limited way. The presence of the sulfur compounds in these chemical compositions contributes to undesirable odors and limits the use of the products to minimal commercial applications.

Some treatment processes heretofore used in the treatment of such waste chemicals have employed chlorine or compositions containing chlorine derivatives for bleaching the waste chemicals. From such treatments the products may carry the odor of the halogen and may carry such halogen in combination.

Another commercial treatment now in use for refining black liquor is described as follows:

A crude, ill-smelling tall oil is separated from kraft paper black liquor by treatment of a black liquor with dilute sulfuric acid. The isolated organic acids are then processed in the usual way for refining tall oil. A number of methods are in industrial use. The final step of refining usually involves distillation using processes and equipment controlled by Armour & Co. In general the high vacuum distillation of crude tall oils produces tall oil acids from which a certain percentage of rosin acid has been separated and remains in the non-distilled residues. Some of these rosin acids may be vacuum distilled at higher temperatures, and they contain a certain amount of sulfur compounds which may be removed in accordance with this invention. A certain percentage of the rosin acids is distilled with the liquid tall oil acids and remains in the oils, these distilled tall oils are then offered for commercial use. They consist of a mixture of stearic, oleic, linoleic, linolenic and rosin acids and some higher boiling products called unsaponifiables which are generally phytols.

Depending upon many factors distilled tall oils contain various percentages of these constituents. In addition, they also contain small amounts of nitrogen and sulfur compounds which render them unfit for many uses as substitutes for expensive fatty acids produced from oils of vegetable or animal origin. The utilization of the products and processes of this invention to provide tall oil acids of superior quality and competitive with fatty acids derived from vegetable or animal oils is herein described.

It it is desirable to collect the phytols (higher alcohols constituting the unsaponifiables) one can dissolve the crude tall oil by adding 10% toluene, filter to remove the phytols, and treat the solution in accordance with this invention to remove sulfur compounds. After filtration the toluene may be removed and recovered by distillation.

If the phytols are not desired the crude tall oil can be freed of the phytols by adding 10% toluene and then treated in accordance with the process described in this invention; filtering to remove the phytols and the undesirable sulfur compounds, filter aids and reaction products and then distilling the filtrate to recover the toluene.

Among the objects of the present invention are included new, simple and relatively inexpensive methods for the production of low sulfur-containing refined chemicals from waste products obtained in the preparation of kraft paper pulp.

Other objects will appear from the more detailed description of the invention set forth below, it being understood that such more detailed description is given by way of illustration and explanation only, and not limitation, since various changes may be made therein by those skilled in the art without departing from the scope and spirit of the invention.

In accordance with the present invention, the products treated are waste products from the kraft paper industry and generally fall into the groups known as sulfate turpentine, tall oil, and rosins, all of which may be obtained contaminated with sulfur-containing components that give undesirable odor and are of limited use in industry. Generally only a short treatment with agitation by mechanical means with the treating agent is necessary for removal of the sulfur compounds present.

The principle of the process resides in extraction of impurities consisting principally of sulfur compounds by treating substantially at room temperatures under agitatiion for a period normally less than thirty minutes, an impure material as a liquid or a solution in an easily separable solvent with an addition of a covalent complex of a boron halide preferably borontrifluoride with a nitrogen containing compound from amines, amides, ureas, nitriles, ammonia, etc. The following nitrogen containing complexes are illustrative: urea, hexamethylene tetramine, diethanolamine, and triethanolamine, and the non-nitrogen containing complexes are illustrated by phenols such as phenol, and etherates. Other phenol derivatives and etherates may be used to form boron trihalide complexes, particularly the phenol and etherates, but are not as satisfactory. These organic or inorganic compounds may also contain other atoms such as sulfur. These covalent compounds may contain an excess of one or the other components. The amount of covalent compounds necessary is small but consistent with the percentage of impurities to be removed.

The process is based on the extraction and removal of sulfur bearing compounds present in the waste materials to be purified. Some of the compounds which also contain nitrogen or nitrogen without sulfur are also removed when they are present. The process is also applicable to the removal of the compounds defined in the preceding paragraphs or such compounds present in hydrocarbons and other organic liquids either in solution or as such. It also applies to the treatment of such compounds as solids in solution. Where solutions are treated, the solvents used may contain small quantities of sulfur or nitrogen containing compounds. The process will then remove impurities from the solvent as well as from the materials dissolved therein, thus obtaining after removal or separation of the extract a purified distilled solvent besides. Some solids at room temperature may also be treated at temperatures higher than their melting point within the limits of the properties of the treating extractant.

Before treating solutions of the materials to be purified by the process, selection of the proper solvent to be used in the process may result in the separation of other undesirable impurities such as higher alcohols which are not readily removed by vacuum distillation either before or after the application of the purification process of this invention as shown by the example cited.

We have discovered that when these covalent compounds are used as such or in solution in polar solvents they generally extract removable impurities by forming highly colored products ordinarily soluble in the treated medium. Under these conditions separation of the impurities becomes very difficult. In some cases the colored material containing the impurities can be removed by agitation with an appropriate solvent. However, the appropriate solvent is most satisfactory only if it gives a clean separation and does not appreciably dissolve the purified material itself. It has been discovered that the best, fastest, most satisfactory method consists of dissolving the covalent compound in a solvent not miscible with the product to be purified. For example: we have found that among desirable solvents for these covalent compounds are the glycols. A number of covalent compounds answering the above definitions and a number of glycols may be employed. Exemplary glycols are ethylene glycol, propylene glycol, diethylene glycol, triethylene glycol, etc.

Among the many possible combinations of covalent compounds and of glycols as solvent solutions, the borontrifluoride-urea complex in triethylene glycol has been found to be of specific value in purifying by-products of the kraft paper industry. Solutions (20% to 40% by weight) of borontrifluoride-urea complex in triethylene glycol are preferred although concentrations of less than 20% and between 40% and a maximum of 50% have been found feasible. The lower concentrations give less colored products and the higher concentrations make crystals of the complex in the treating of viscous solutions.

Other boron fluoride complexes particularly the phenol and the etherates are believed not as effective as the nitrogen-containing complexes, particularly the urea complex. The urea complex is particularly effective because of its ability to coordinate with the sulfur-containing compounds present in the kraft residuals; and, because of its solubility characteristics in triethylene glycol, is more easily removed from the composition being treated than are the other coordination compounds of boron trifluoride complexes.

The following examples will illustrate the invention.

EXAMPLE I

As a specific example, a sample from a lot once distilled turpentine recovered from wash waters of sulphate pulp was divided into two parts. One portion was bleached with chlorine and vacuum distilled according to standard commercial procedure. The other part was treated with the process of this invention using the reagent of Example II below and not vacuum distilled afterward. In the first part there was some sulfur remaining and some chlorine was present. The odor was good; in the other, the sulfur content was much lower and the odor was so good that it was identical to that of distilled spirits of turpentine obtained from gum rosin. Samples were retained in the dark and reopened after six months. The odor of the first was now unpleasant and that of the sample treated by the process of this invention was still unchanged. In other words the sample of sulfate turpentine treated by the process of this invention is up-graded to that of gum rosin turpentine.

EXAMPLE II

A typical treatment for crude tall oil follows: 4,000 grams of a crude tall oil containing sulfur compounds expressed as sulfur at 400 or 500 parts per million are stirred mechanically at room temperature at a speed and under conditions whereby no air is introduced into the stirring liquid. Eight grams of a 40% solution by weight of boron-trifluoride-urea complex in triethylene glycol is introduced under the surface of the liquid. After ten minutes of agitation the liquid is treated with 1.5 grams of powdered calcium fluoride and an equal amount (1.5 grams) of magnesium trisilicate and/or 1.5 grams of activated carbon black. Agitation is continued for two minutes. After filtration or separation of the clear liquid by decantation the color of the original tall oil is improved and its bad odor is eliminated. The treatment has removed between 88% and 92% of the sulfur compounds present. A second treatment using one-half of the amount of borontrifluoride-urea glycol complex originally used and one-quarter of the original amount of calcium fluoride ($CaF_2$) and magnesium trisilicate or carbon black will remove practically all the sulfur compounds present and produce a superior quality tall oil.

EXAMPLE III

Another example describing the use of this invention for processing wood rosin is as follows: a wood rosin sample of commercial quality was treated in a 40% to 50% toluene solution at room temperature with a 20% solution of boron-trifluoride-urea complex in triethylene-glycol at a ratio of 1 to 2 grams of borontrifluoride-urea complex to 1,000 grams of solution with mechanical agitation. The solution was filtered through filter paper to separate the extract. The toluene was removed by evaporation. The resulting rosin was improved in color and odor. Its melting point was slightly increased and it was found to be sulfur free.

EXAMPLE IV

A further example describing the treatment of waste turpentine is as follows. 625 grams of crude sulfate waste turpentine was treated with 6 grams of a 50% solution by weight of boron trifluoride urea complex in triethylene glycol. The mixture was shaken for ten minutes after which 0.6 gram of Darco decolorizing carbon was added. Agitation was continued for one minute and the mixture was immediately filtered. The filtrate was clear, slightly yellow, with a much improved odor indicating the removal of the sulfur-bearing compounds present in the crude sulfate waste turpentine.

Having thus set forth our invention, we claim:

1. In a method for treating non-fibrous waste chemical from kraft paper production for purification, which comprises agitating said chemical in liquid condition without substantially incorporating air into the stirring liquid, in the presence of a borontrifluoride-urea complex, in which the chemical is a crude tall oil in amount of about 4,000 grams containing sulfur at 400 to 500 parts per million and which is stirred mechanically at room temperature at a speed and under conditions whereby no air is incorporated into the stirring liquid, introducing about eight grams of a 40% solution by weight of the borontrifluoride-urea complex in triethylene glycol, after about 10 minutes of agitation adding about 1.5 grams of powdered calcium fluoride and about an equal amount of magnesium trisilicate and/or about 1.5 grams of activated carbon black, continuing the agitation briefly, and separating the clear liquid tall oil of improved color and odor with about 88% to 92% of the sulfur compounds removed.

2. In a method for treating non-fibrous waste chemical from kraft paper production for purification, which comprises agitating said chemical in liquid condition without substantially incorporating air into the stirring liquid, in the presence of a borontrifluoride-urea complex, in which the chemical is a wood rosin of commercial quality in a 40% to 50% toluene solution at room temperature which is treated with the borontrifluoride-urea complex at a ratio of about 1 to 2 grams of borontrifluoride-urea complex to about 1,000 grams of solution with mechanical agitation, filtering off the extract, evaporating off the toluene, and recovering the rosin improved in color and odor, having a slightly increased melting point and being substantially sulfur free.

References Cited

UNITED STATES PATENTS

| | | | |
|---|---|---|---|
| 2,275,186 | 3/1942 | Segesserman | 260—97.7 |
| 2,495,852 | 2/1947 | Lien et al. | 260—108 |
| 2,690,430 | 9/1954 | Anderson | 210—62 |
| 2,980,733 | 4/1961 | Sowa | 210—62 |

OTHER REFERENCES

Collins et al., "The Paper Industry and Paper World," December 1944, pp. 1139–1141 relied on.

DONALD E. CZAJA, Primary Examiner

W. E. PARKER, Assistant Examiner

U.S. Cl. X.R.

210—62; 260—97.5, 108